United States Patent
Kocaoglu et al.

(10) Patent No.: US 11,733,361 B2
(45) Date of Patent: Aug. 22, 2023

(54) POLARIZATION ENCODED BEAM DELIVERY AND COLLECTION

(71) Applicant: Aeva, Inc., Mountain View, CA (US)

(72) Inventors: Omer P. Kocaoglu, Fremont, CA (US); Neal N. Oza, Palo Alto, CA (US); Keith Gagne, Santa Clara, CA (US); Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 1144 days.

(21) Appl. No.: 16/123,939

(22) Filed: Sep. 6, 2018

(65) Prior Publication Data
US 2020/0081106 A1 Mar. 12, 2020

(51) Int. Cl.
*G01S 7/499* (2006.01)
*G01S 7/481* (2006.01)
(Continued)

(52) U.S. Cl.
CPC ............ *G01S 7/499* (2013.01); *G01S 7/4817* (2013.01); *G01S 17/08* (2013.01); *G01S 17/89* (2013.01);
(Continued)

(58) Field of Classification Search
CPC ...... G01S 7/499; G01S 7/4814; G01S 7/4815; G01S 7/4816; G01S 7/4817; G01S 17/08; G01S 7/484; G01S 17/89; G02B 6/272
See application file for complete search history.

(56) References Cited

U.S. PATENT DOCUMENTS

| 5,110,207 A | * | 5/1992 | Harris | ..................... G01S 7/499 356/28.5 |
| 2002/0018300 A1 | * | 2/2002 | Ducellier | ............. G02B 5/3083 359/639 |

(Continued)

FOREIGN PATENT DOCUMENTS

| CN | 101825711 A | 9/2010 |
| EP | 3187899 A2 | 7/2017 |

(Continued)

OTHER PUBLICATIONS

Transmittal of International Preliminary Report on Patentability dated Mar. 18, 2021, for International Application No. PCT/US2019/049092, filed Aug. 30, 2019, pp. 10.

(Continued)

*Primary Examiner* — Yuqing Xiao
*Assistant Examiner* — Benjamin Richard Hebert
(74) *Attorney, Agent, or Firm* — Womble Bond Dickinson (US) LLP (57) ABSTRACT

A light detection and ranging (LIDAR) apparatus includes optical source configured to emit a laser beam in a first direction, a polarization wave plate configured to transform polarization state of the laser beam headed in the first direction toward a target environment, and a reflective optical component to return a portion of the laser beam toward the optical source along a return path and through the polarization wave plate as a local oscillator signal. A polarization selective component to separate light in the return path based on the optical polarization, wherein the polarization selective component refracts orthogonally polarized light along the return path to a divergent path, wherein the polarization selective component is further configured to enable interference between the local oscillator signal and the target signal to generate a combined signal. An optical detector configured to receive the combined signal from the (Continued)

second direction and lensing optics configured to collimate the refracted light along a focal plane of the optical detector.

20 Claims, 4 Drawing Sheets

(51) Int. Cl.
  *G01S 17/08* (2006.01)
  *G01S 17/89* (2020.01)
  *G02B 6/27* (2006.01)
  *G01S 17/34* (2020.01)
  *G01S 17/58* (2006.01)

(52) U.S. Cl.
  CPC .............. *G01S 7/4815* (2013.01); *G01S 17/34* (2020.01); *G01S 17/58* (2013.01); *G02B 6/272* (2013.01)

(56) References Cited

U.S. PATENT DOCUMENTS

| | | | | |
|---|---|---|---|---|
| 2002/0181824 | A1* | 12/2002 | Huang | G02B 6/272 |
| | | | | 385/11 |
| 2004/0012770 | A1* | 1/2004 | Stierle | G01S 17/08 |
| | | | | 356/4.01 |
| 2009/0080695 | A1* | 3/2009 | Yang | G06V 10/255 |
| | | | | 382/103 |
| 2010/0277714 | A1* | 11/2010 | Pedersen | G01S 7/497 |
| | | | | 356/28 |
| 2011/0205523 | A1 | 8/2011 | Rezk | |
| 2011/0228249 | A1 | 9/2011 | Koehler | |
| 2014/0168631 | A1* | 6/2014 | Haslim | G02B 6/262 |
| | | | | 356/4.01 |
| 2016/0377721 | A1* | 12/2016 | Lardin | H01S 5/0622 |
| | | | | 356/5.09 |
| 2017/0115206 | A1* | 4/2017 | De Boer | G02B 6/4225 |
| 2017/0307736 | A1* | 10/2017 | Donovan | G01S 7/499 |
| 2018/0284285 | A1* | 10/2018 | Curatu | G01S 17/10 |
| 2019/0310377 | A1* | 10/2019 | Lodin | G01J 3/00 |

FOREIGN PATENT DOCUMENTS

| | | |
|---|---|---|
| JP | H09-166414 A | 6/1997 |
| JP | 2011-503526 A | 1/2011 |
| JP | 2012-502301 A | 1/2012 |

OTHER PUBLICATIONS

Barber Zeb W et al., "Experimental demonstration of differential synthetic aperture ladar", 2015 Conference on Lasers and Electro-Optics (CLEO), OSA, May 10, 2015, pp. 1-2.
International Search report and Written Opinion for the International Application No. PCT/US2019/049092, dated Nov. 8, 2019.
Office Action in related Japanese application 2021-537444 dated May 29, 2023, pp. 1-4.

* cited by examiner

POLARIZATION ENCODED BEAM DELIVERY AND COLLECTION

TECHNOLOGICAL FIELD

The present disclosure relates generally to light detection and ranging (LIDAR) and, in particular, to multiple-wavelength LIDAR that provides simultaneous measurement of range and velocity across two dimensions.

BACKGROUND

Figure 1A:
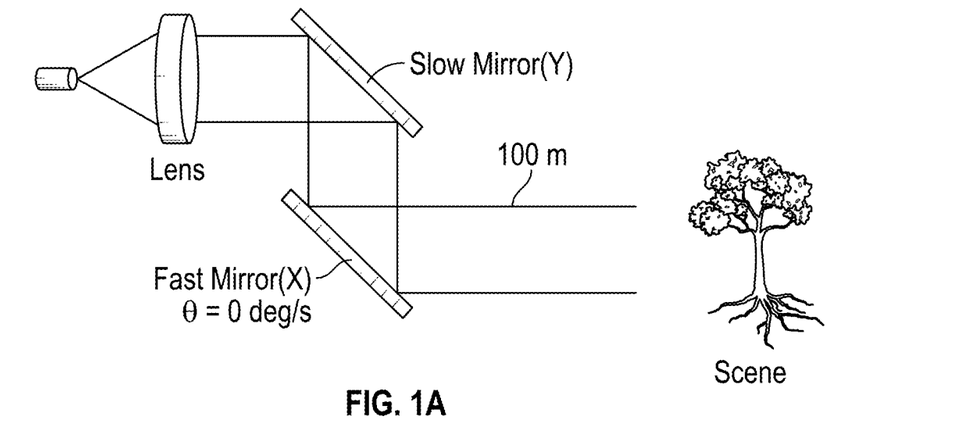
FIGS. 1A and 1B illustrate an optical scanning system of a typical light detection and ranging (LIDAR) system to steer a laser beam to scan a scene, and illustrating decentering of the return laser beam at the fiber tip.

Fast-scanning mirrors are the primary components used to illuminate a scene in most conventional LIDAR systems. As shown in FIG. 1A, one mirror typically scans quickly along the X direction (azimuth), while another mirror scans slowly along the Y direction (elevation). Upon target reflection, the same channel that emitted the light detects the light, typically a single mode fiber. The collected light has a measured delay or an altered frequency signature that is used to extract range, and potentially velocity, information. A 3D point cloud can be established when the point-wise detected range information is combined with angular position feedback from the scanning mirrors.

Figure 1B:
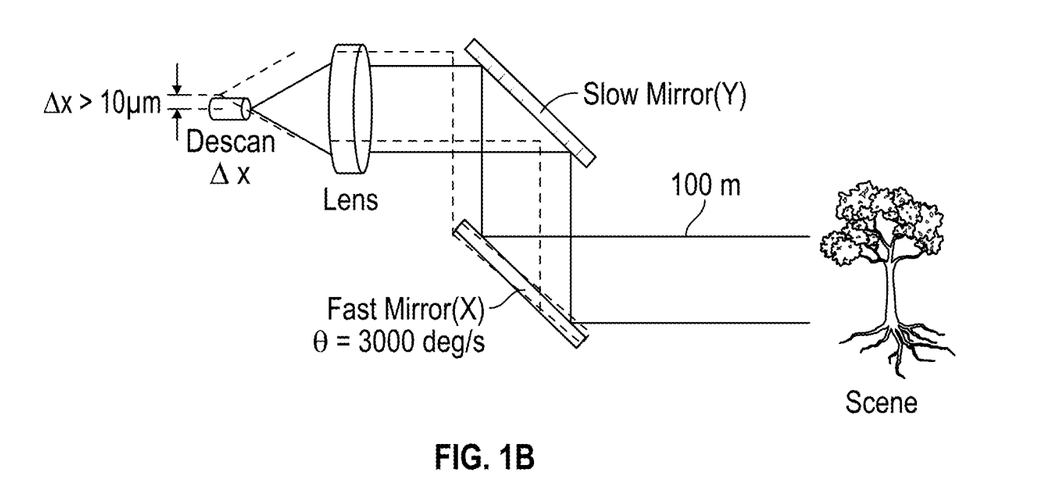

To achieve higher frame rates, the mirror's angular velocity is increased, especially that of the scanner in faster scan direction. When using the mirrors with an angular velocity at high speed and single-mode fiber-based detection, the target signal from distant objects is severely degraded. Signal degradation is mainly due to the difference in angular position of the scanner mirror from the launch time of the laser signal (pulsed or frequency swept) to the collection time of the same signal from a distant scattering target. As shown in FIG. 1B, a slight angular change causes a walk-off of the target signal at the fiber tip decreasing the coupling efficiency, which manifests itself as a weaker signal detection. Such degradation becomes more severe as the fiber diameter decreases, e.g. a single mode fiber with ~10 µm diameter, or as the mirror's angular velocity increases.

BRIEF SUMMARY

Example implementations of the present disclosure are directed to an improved scanner for a LIDAR system with coherent detection. Example implementations of the present disclosure are based on a type of LIDAR that uses frequency modulation (FM) and coherent detection to overcome the shortcomings of traditional LIDAR systems and the limitations of prior FM LIDAR systems. Historically, FM LIDAR systems suffer from significant losses in the beam's return path; thus, such systems, which are often quite bulky, require a higher beam output power to measure distances comparable to time-of-flight (TOF) LIDAR systems. Alas, the range is limited by the operating distance for eye-safe output powers.

Example implementations of the present disclosure are configured to simultaneously measure the range and velocity, using coherent detection and having the added benefit of immunity to crosstalk from other LIDAR systems. Other implementations may be used with incoherent systems to improve, range, framerate, or detection. Example implementations minimize optical losses in the beam's return path, thereby increasing the system's measurement range. Additionally, by using nondegenerate laser sources, example implementations can leverage mature wavelength division multiplexing (WDM) techniques often used in integrated silicon photonics, a desired platform due to its compactness and relative stability in varying environmental conditions.

As described above, the decenter at the fiber tip upon return of the target signal is a primary source of degradation in coupling efficiency. Example implementations of the present disclosure mitigate the hampering effect of the decentered returned light at the fiber tip by separating the optical detection from the primary source fiber. The light leaving the system is non-polarized light that is polarized by a quarter-wave (QWP) plate before reflected by either a reflective surface (potentially a coating on the QWP) or by the target environment. The portion reflected by the reflective surface acts as a local oscillator to interfere with light returned from the environment. As both the local oscillator signal and target signal are returned down the return path, they interfere with one another and pass through a polarization selective component. The polarization selective component can generate a deflection angle for the combined signal and deflect the light from the path of the light source. Lensing can then direct the divergent return path toward an optical detector. Because the beams have interfered before the optical detectors and the detection path is decoupled from source path, the optical detectors can be larger core fibers or waveguides, silicon-based optical detectors, or other types of optical detectors that can sense the combined signal.

The present disclosure thus includes, without limitation, the following example implementations.

Some example implementations provide a LIDAR apparatus comprising: an optical source configured to emit a laser beam in a first direction; a polarization wave plate configured to polarize the laser beam headed in the first direction toward a target environment; a reflective optical component to return a portion of the laser beam toward the optical source along a return path and through the polarization wave plate as a local oscillator signal; a polarization selective component to separate light in the return path based on the optical polarization, wherein the polarization selective component refracts polarized light along the return path to a divergent path, wherein the polarization selective component is further configured to enable interference between the local oscillator signal and the target signal to generate a combined signal; an optical detector configured to receive the combined signal from the second direction; lensing optics configured to collimate the refracted polarized light along a focal plane of the optical detector.

In some example implementations of the LIDAR system of any preceding example implementation, or any combination of preceding example implementations further comprise a second optical source and a second optical detector, the second optical source and the second optical detector substantially co-planar to the optical source and optical detector.

In some example implementations of the LIDAR system of any preceding example implementation, or any combination of preceding example implementations the optical source and the second optical source provide illumination at different wavelengths.

In some example implementations of the LIDAR system of any preceding example implementation, or any combination of preceding example implementations the optical source and optical detector are disposed with a vertical displacement in a direction of a displacement angle of the polarization selective component.

In some example implementations of the LIDAR system of any preceding example implementation, or any combination of preceding example implementations the reflective optical component comprises a reflected coating on the polarization wave plate.

In some example implementations of the LIDAR system of any preceding example implementation, or any combination of preceding example implementations the optical source comprises a single-mode optical fiber and the optical detector comprises a multi-mode optical fiber.

In some example implementations of the LIDAR system of any preceding example implementation, or any combination of preceding example implementations further comprise a second optical source, wherein the optical source and the second optical source each provide multi-wavelength laser beams.

In some example implementations of the LIDAR system of any preceding example implementation, or any combination of preceding example implementations the polarization selective component comprises one or more of a Rochon prism, a Wollaston prism, or a Senarmont prism.

In some example implementations of the LIDAR system of any preceding example implementation, or any combination of preceding example implementations the optical detector is one of a silicon-based detector, a multi-mode fiber, or a large area detector.

Some example implementations provide a light detection and ranging (LIDAR) apparatus comprising: an optical source configured to emit a laser beam in a first direction; a QWP configured to transform the polarization states of the laser beam headed in the first direction and of the target signal returned through the lensing optics such that these polarizations are orthogonal; a reflective optical component to return a portion of the laser beam toward the optical source along a return path and through the polarization wave plate as a local oscillator signal; a polarization selective component to separate light in the return path based on the optical polarization, wherein the polarization selective component refracts polarized light along the return path to a divergent path, wherein the polarization selective component is further configured to enable interference between the local oscillator signal and the target signal to generate a combined signal; an optical detector configured to receive the combined signal from the second direction; lensing optics configured to collimate the refracted polarized light along a focal plane of the optical detector.

In some example implementations of the LIDAR system of any preceding example implementation, or any combination of preceding example implementations further comprise a second optical source and a second optical detector, the second optical source and the second optical detector substantially co-planar to the optical source and optical detector.

In some example implementations of the LIDAR system of any preceding example implementation, or any combination of preceding example implementations the optical source and the second optical source are configured to provide illumination at different wavelengths.

In some example implementations of the LIDAR system of any preceding example implementation, or any combination of preceding example implementations the optical source and optical detector are disposed with a vertical displacement in a direction of a displacement angle of the polarization selective component.

In some example implementations of the LIDAR system of any preceding example implementation, or any combination of preceding example implementations the optical source comprises a single-mode optical fiber and the optical detector comprises a multi-mode optical fiber.

In some example implementations of the LIDAR system of any preceding example implementation, or any combination of preceding example implementation the polarization selective component comprises one or more of a Rochon prism, a Wollaston prism, or a Senarmont prism.

In some example implementations of the LIDAR system of any preceding example implementation, or any combination of preceding example implementations the optical detector is one of a silicon-based detector, a multi-mode fiber, or a large area detector.

In some example implementations of the LIDAR system of any preceding example implementation, or any combination of preceding example implementations further comprise lensing to collimate the laser beam through the polarization beam splitter.

In some example implementations of the LIDAR system of any preceding example implementation, or any combination of preceding example implementations the polarization wave plate is further to transform polarization state of the local oscillator signal and the target signal returned from the target or reflective optical component.

In some example implementations of the LIDAR system of any preceding example implementation, or any combination of preceding example implementations further comprise a second fast scanning mirror, wherein the first fast scanning mirror is to scan across a first axis and the second fast scanning mirror is to scan across a second axis.

In some example implementations of the LIDAR system of any preceding example implementation, or any combination of preceding example implementations further comprise a control system, the control system comprising a processing device to: control optical drivers of active optical circuits; control motion operation of the fast scanning mirror; and process signal received from the optical detectors to generate a point cloud of a three-dimensional space.

In some example implementations of a method of operating a LIDAR system comprises generating a laser beam along an illumination path using an optical source; transforming polarization of the laser beam with a quarter wave plate to have circular polarization; reflecting, using a reflective optical component, a portion of the laser beam back along the illumination path in a collection path to generate a local oscillator signal; receiving a target signal from the environment along the illumination path based on reflections from an object in the environment; and refracting the local oscillator signal and the target signal toward an optical detector using a polarization selective component.

In some example implementations of the LIDAR methods of any preceding example implementation, or any combination of preceding example implementations further comprises polarizing, with the quarter wave plate the local oscillator signal and the target signal after reflections to have a first linear polarization orthogonal to a second linear polarization of the generated laser beam.

In some example implementations of the LIDAR methods of any preceding example implementation, or any combination of preceding example implementations further comprises collimating, with lensing optics, the local oscillator signal and the target signal on a collection path parallel to the illumination path to improve collection at an optical detector.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Like reference numerals refer to like elements throughout.

Figure 2:
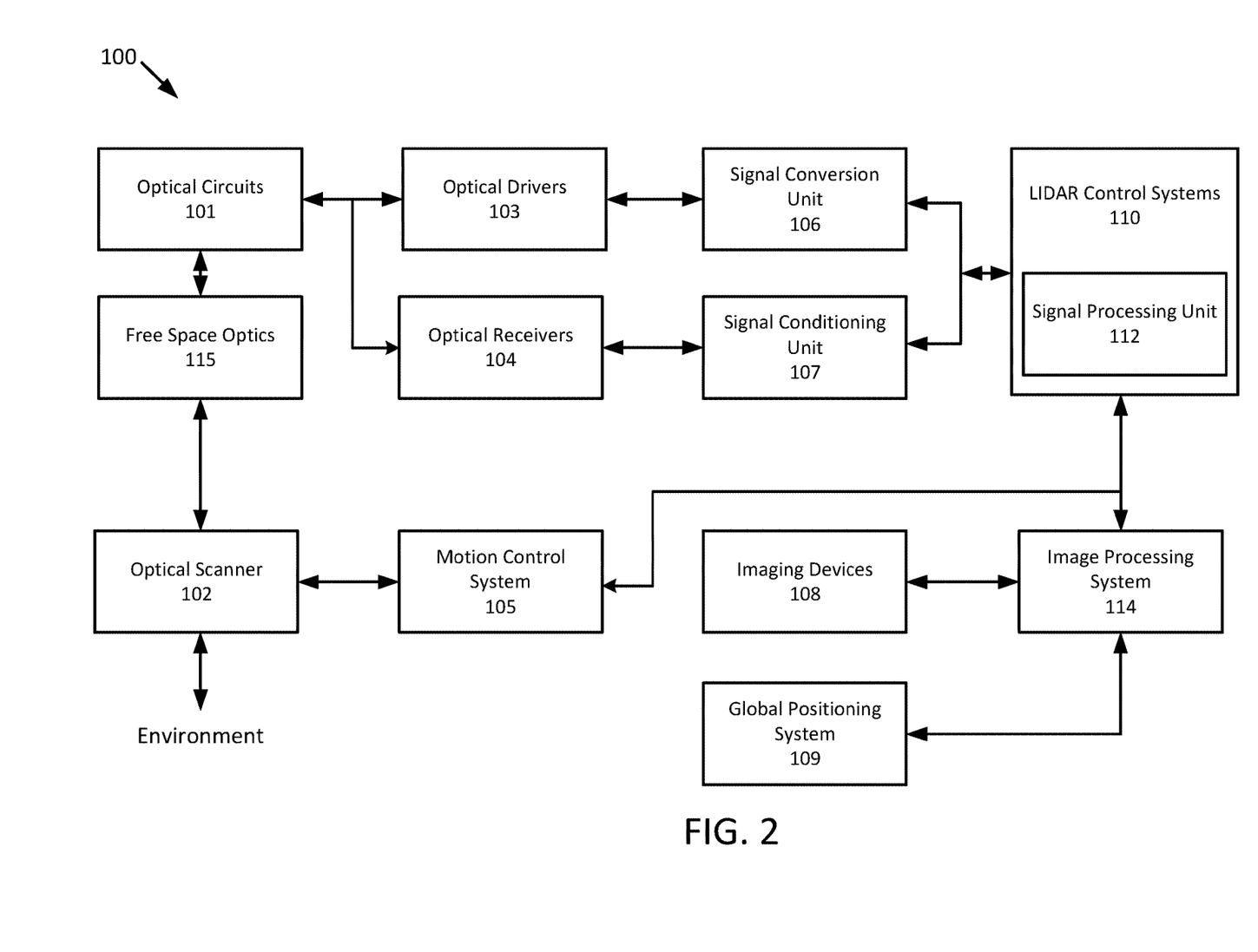
FIG. 2 illustrates a LIDAR system according to example implementations of the present disclosure.

FIG. 2 illustrates a LIDAR system 100 according to example implementations of the present disclosure. The LIDAR system 100 includes one or more of each of a number of components, but may include fewer or additional components than shown in FIG. 2. As shown, the LIDAR system 100 includes optical circuits 101. The optical circuits 101 may include a combination of active optical circuits and passive optical circuits. Active optical circuit may generate, amplify, and detect optical signals and the like. In some examples, the active optical circuit includes lasers at different wavelengths, one or more optical amplifier, one or more optical detectors, or the like.

Passive optical circuits may include one or more optical fibers to carry optical signals, and route and manipulate optical signals to appropriate input/output ports of the active optical circuit. The passive optical circuits may also include one or more optical components such as taps, wavelength division multiplexers, splitters/combiners, polarization beam splitters, collimators, birefringent polarization selective components, Mach-Zehender interferometers, modulators, optical attenuators, circulators or the like. In some embodiments, as discussed further below, the passive optical circuits may include components to transform polarization of light and direct received polarized light to optical detectors using a polarization selective component.

An optical scanner 102 includes one or more scanning mirrors that are rotatable by galvanometers along respective orthogonal axes to steer optical signals to scan an environment according to a scanning pattern. The optical scanner 102 also collects light incident upon any objects in the environment into a return laser beam that is returned to the passive optical circuit component of the optical circuits 101. For example, the return laser beam may be directed to an optical detector by a polarization selective component. In addition to the mirrors and galvanometers, the optical scanning system may include components such as a polarization wave plates, lenses, anti-reflective coated windows, reflective coated lensing, micro-lens arrays, or the like.

To control and support the optical circuits 101 and optical scanner 102, the LIDAR system 100 includes a LIDAR control system 110. The LIDAR control systems 110 may function as a processing device for the LIDAR system 100. In some embodiments, the LIDAR control system 110 may include signal processing 112 such as a digital signal processor. The LIDAR control systems 110 are configured to output digital control signals to control optical drivers 103. In some embodiments, the digital control signals may be converted to analog signals through signal conversion unit 106. For example, the signal conversion unit 106 may include a digital-to-analog converter. The optical drivers 103 may then provide drive signals to active components of optical circuits 101 to drive optical sources such as lasers and amplifiers. In some embodiments, several optical drivers 103 and signal conversion units 106 may be provided to drive multiple optical sources.

The LIDAR control systems 112 are also configured to output digital control signals for the optical scanner 102. A motion control system 105 may control the galvanometers of the optical scanner 102 based on control signals received from the LIDAR control systems 110. For example, a digital-to-analog converter may convert routing information from the LIDAR control systems 110 to signals interpretable by the galvanometers in the optical scanner 102. In some embodiments, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical circuit, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control system 110 or other systems connected to the LIDAR system 100.

In operation according to some examples, the LIDAR system 100 is configured to use nondegenerate laser sources to simultaneously measure range and velocity across two dimensions. This capability allows for real-time, long range measurements of range, velocity, azimuth, and elevation of the surrounding environment. In some example implementations, the system points multiple modulated laser beams to the same target.

In some examples, the scanning process begins with the optical drivers 103 and LIDAR control system 110. The LIDAR control system 110 instructs the optical drivers 103 to independently modulate the one or more lasers, and these modulated signals propagate through the passive optical circuit to the collimator. The collimator directs the light at the optical scanning system that scans the environment over a preprogrammed pattern defined by the motion control subsystem. The optical circuits also include a polarization wave plate to transform polarization of the light as it leaves the optical circuits 101. For example, either a quarter-wave plate or half-wave plate may be used to transform the polarization of light. A portion of the circularly polarized light may also be reflected back to the optical circuits 101. For example, lensing or collimating systems may have natural reflective properties or a reflective coating to reflect a portion of the light back on a return path of the optical circuits 101. For example, the polarization wave plate may be coated to return at least a portion of the source light.

Optical signals reflected back from the environment pass through the optical circuits 101 to the receivers. Because the light is orthogonally polarized, it may be refracted by a polarization selective component along with the portion of other orthogonally polarized light that was reflected back to the optical circuits 101 as a local oscillator signal. Accordingly, rather than returning to the same fiber or waveguide as an optical source, the refracted light is directed on a divergent path to separate optical receivers. These signals may interfere within the polarization selective component to generate a combined signal. Each beam signal that returns from the target produces a time-shifted waveform. The temporal phase difference between the two waveforms generates a beat frequency measured on the optical receivers (photodetectors). The combined signal can then be directed to the optical receivers 104. For example, lensing may direct the divergent beam in a parallel path to an optical detector adjacent to the laser source. Configuration of optical circuits 101 for polarizing and directing beams to the optical receivers 104 are described further below.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometer as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Traditional LIDAR systems provide either a flooding of light into a scene or scan the scene with a raster pattern. When using a raster pattern, the laser is pulsed and analyzed upon return to provide distance, velocity and other data. The collected data points can be combined into a point cloud to generate a scene. The framerate generated for the scene is at least partially a function of scan speed of the laser. For example, the faster the laser can scan, the more points it can generate in a period of time. Typically, the scene may be generated with two mirrors, one which scans across a first axis and one which scans across a second axis. However, these systems can suffer from degraded target signals when the scanning mirrors are rotated with an increased rotational speed. The time it takes a laser pulse to reach the target and return to the scanning system, the mirror has moved due to its rotational velocity, and this slight angle deviation of the fast scanning mirror causes a walk-off of the target signal at the fiber tip. This can be a larger problem with smaller fiber tips. For example, a single mode fiber tip may be approximately 10 um. Thus, a very small walk-off can have a large effect on such systems.

Example implementations of the present disclosure use polarization encoding of the illumination and collection beam paths to improve collection efficiency. This allows the system to use larger fibers such as multi-mode fibers as receivers. For example, a multi-mode collection fiber may be approximately 60 um instead of 10 um for a single-mode fiber. Additionally, other types of optical detectors can be used. Accordingly, the systems can combine the pulsed laser light from the target with reflected local light within a polarization selective component. Each of the locally returned light and target return light may be orthogonally polarized after generated by an optical source. Upon return the orthogonally polarized light can be refracted to a separate return path and directed toward separate optical detectors. Because the polarized light from the local oscillator signal and target signal has already interfered within the polarization beam splitter or otherwise before reaching the optical detector, the optical detector can be a larger detector than the single mode fiber that acts as the optical source. For example, the optical detector can be a silicon-based detector, a multi-mode fiber, large area detector, or the like.

Accordingly, by polarization-encoding the illumination and collection paths and separating the latter path using a polarization discriminating optic, one can couple detected photons into multi-mode fibers, thereby improving the collection efficiency of the system—and thus, the signal-to-noise ratio (SNR). Additionally, this design improves collection of photons from farther objects, when used with any scanner. These photons would normally be lost when the round-trip travel time for the "long-distance" is slower than the scanner's movement across the collection aperture.

Figure 3:
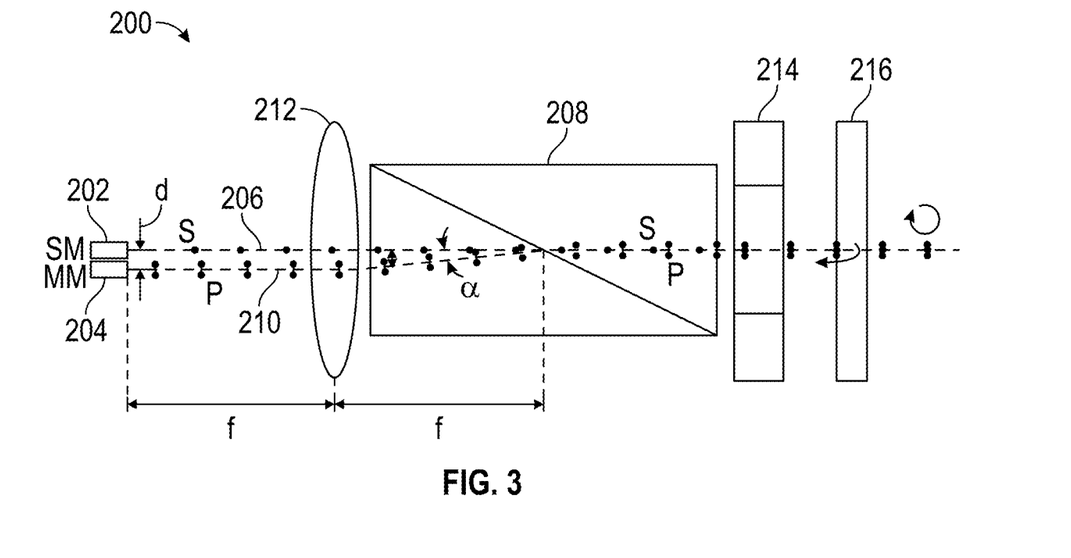
FIG. 3 illustrates aspects of optical circuits and optical scanning system of the LIDAR, according to some example implementations.

FIG. 3 illustrates aspects of the optical circuits 200 of a scanning system. For example, the optical circuits 200 of FIG. 3 may be part of optical circuits 101 of the LIDAR system 100 as shown with respect to FIG. 2 above of the LIDAR system 100, according to some example implementations. The optical circuits 200 in FIG. 3 are shown as a side-view of a beam delivery system. The optical components use polarization encoding of the illumination and collection beam paths to improve collection efficiency.

The optical circuits 200 use a polarization selective component 208 to separate the illumination beam path 206 and collection beam path 210. The illumination beam path is centered on a single-mode optical fiber 202 that provides a laser beam to passive optical systems. The illumination beam path is passed through a lens 212 to collimate the light. For example, the single-mode optical fiber 202 may provide linearly polarized divergent light which is collimated by the lens 212. The illumination path 206 then passes through a polarization selective component 208 and the polarization state is transformed by polarization wave plate 214. For example, the polarization wave plate 214 may be quarter wave plate or a half-wave plate. A quarter-wave plate may transform the polarization to a circular polarization state. A reflective optic 216 following the polarization wave plate 214 returns a portion of the beam along the illumination path. In some embodiments, the reflective optic 216 may be a partially reflective optic, a coating on the polarization wave plate 214, or other reflective optics.

The remaining portion of the beam is transmitted to the environment and a portion of the pulse may reflect back from one or more objects. For example, the light may be transmitted to the environment by one or more fast scanning mirrors as discussed with respect to FIG. 2 in a raster pattern. Light returning from the reflective optic 216 and the target environment are linearly polarized by the polarization wave plate 214. The linear polarization of the returned beam is orthogonal to the polarization provided by the illumination beam provided by the single-mode fiber 202. Accordingly, as the reflected light and light from the target environment pass through the polarization selective component they are refracted on a deviated path offset from the illumination path based on the birefringence of the polarization selective component 208. The combined beam can then be focused with the collimating lens 212 toward a multi-mode fiber 204. In some embodiments other detectors than multi-mode fibers may be used to detect the returned light. For example, the optical detectors may be a silicon-based detector, a multi-mode fiber, large area detector, or the like. The local oscillator signal and the signal from the target have interfered to generate a combined signal. Accordingly, there is no need to have the two interfere within a single mode fiber. The combined signal can then be used to interpret distance, velocity, or other factors about the environment at the target point.

In some embodiments, a three-way intersection of the illumination path 206, the back focal plane of the lens 212, and diagonal plane of the polarization selective component 208 define a placement of the component to ensure that the return path 210 is parallel to the illumination path 206. This improves coupling of the return light into the multi-mode fiber 204. The longitudinal placement of the reflective optic 216 along the optical axis defines the coherence gate, and thus the zero range for optical path-length mismatch measurements. For example, the placement of the reflective optic 216 can be used to define a maximum distance at which measurements can be made. The polarization selective component 208 refracts the beam from the collection path to an off-axis path that is at an angle $\alpha$ to the system's optical axis. This angle, determined by the birefringence properties of the prism, creates a vertical displacement d of the collected light on the focal plane of lens L. Placement of a larger core, multi-mode waveguide parallel to the illumination waveguide allows for improved collection efficiency and signal to noise ratio accordingly.

In some embodiments, the polarization selective component 208 is a Rochon prism that encodes the polarization of the illumination and collection optical paths. The polarization selective component 208, however, could include other types of polarization selective elements. For example, such polarization selective components 208 could include Wollaston or Senarmont prisms.

The reflective optics 216 are shown as a local single surface reflector after the polarization wave plate 214 that samples a portion of the illumination beam, returning it down the common path with light returning from targets. This local sample of the illumination beam experiences the same polarization rotations as the light illuminating the target space, thereby interfering with light from more distant objects for range and velocity measurements. Accordingly, the local (or partial) reflector 216 minimizes the overall system complexity by avoiding construction of a dedicated local oscillator waveguide photonic circuitry. The reflective optic 216 can be an independent optic, a coating on the target side surface of polarization wave plate 214, or a controlled reflection of an optic after the polarization wave plate 214.

Figure 4:
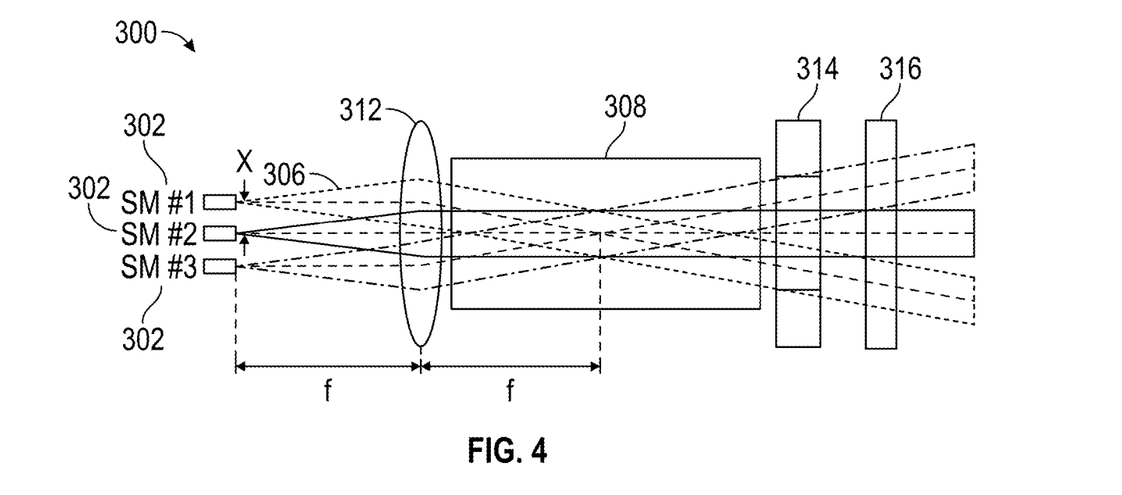
FIG. 4 illustrates aspects of optical circuits and optical scanning system of a LIDAR, according to some example implementations.

FIG. 4 illustrates aspects of the optical circuits 300 of a beam delivery system. For example, the optical circuits 300 of FIG. 4 may be part of optical circuits 101 of the LIDAR system 100 as shown with respect to FIG. 2 above, according to some example implementations. The optical circuits 300 in FIG. 4 are shown as a top-view of a beam delivery system. The optical components use polarization encoding of the illumination and collection beam paths to improve collection efficiency. In some embodiments the optical circuits 300 of FIG. 4 may be the same or similar as the optical circuits 200 of FIG. 3. For instance, the side view of FIG. 3 shows a single set of optical sources and detectors. However, in some embodiments, there may be additional sets that cannot be seen due to the perspective. Additionally, the top view of FIG. 4 shows a number of optical sources and no detectors due to the perspective.

The optical circuits 300 use a polarization selective component 308 to separate the illumination beam path 306 and a collection beam path. Although not shown, the collection beam path may be located beneath the illumination beam path 306. The illumination beam path is centered on a single-mode optical fiber 302 that provides a laser beam to passive optical systems. The illumination beam path is passed through a lens 312 to collimate the light. For example, the single-mode optical fiber 302 may provide linearly polarized divergent light which is collimated by the lens 312. The illumination path 306 then passes through a polarization selective component 308 and is a quarter-wave plate 314 transforms the polarization state of the light to circular polarization. A reflective optic 316 following the quarter-wave plate 314 returns a portion of the beam along the illumination path 306. Although described as a quarter-wave plate, in some embodiments, the quarter-wave plate 314 may instead be another type of polarization wave plate. For example, the quarter-wave plate may instead by a half-wave plate.

The operation of the components of optical circuits 300 may be similar to those described with respect to optical circuits 200 of FIG. 3. For example, the non-reflected portion of the beam is transmitted to the environment and a portion of the pulse may reflect back from one or more objects. Light returning from the reflective optic 316 and the target environment are linearly polarized by the quarter-wave plate 314. Accordingly, as the reflected light and light from the target environment pass through the polarization selective component they are refracted on a deviated path offset from the illumination path 306 based on the birefringence of the polarization selective component 308. The combined beam can then be focused with the collimating lens 212 toward a multi-mode fiber 204.

The operation of the optical circuits 300 includes multiple single-mode optical fibers 302. By using multiple single-mode optical fibers 302, the system becomes a 3D optical sensor by adding lateral scanning component/s at the output that angularly manipulate the target beams. Accordingly, multiple beams can be used simultaneously to scan an environment. In some embodiments, these single-mode optical fibers 302 may operate at different wavelengths. However, placement of multi-mode fibers or other detectors may need to be modified with respect to the single-mode optical fibers 302 based on characteristics of the birefringence of the polarization selective component 308. While shown with three single-mode optical fibers, the array of fibers may include any number that fit within the physical dimensions of the optical circuit 300. Furthermore, as shown in optical circuits 300, the collimation of the illumination beams by the lens 312 reduces the necessary size of the polarization selective device 308. The polarization selective device 308, quarter-wave guide 314, reflective optics 316 and lens 312 may each be as described in the various embodiments shown in FIG. 3.

Figure 5:
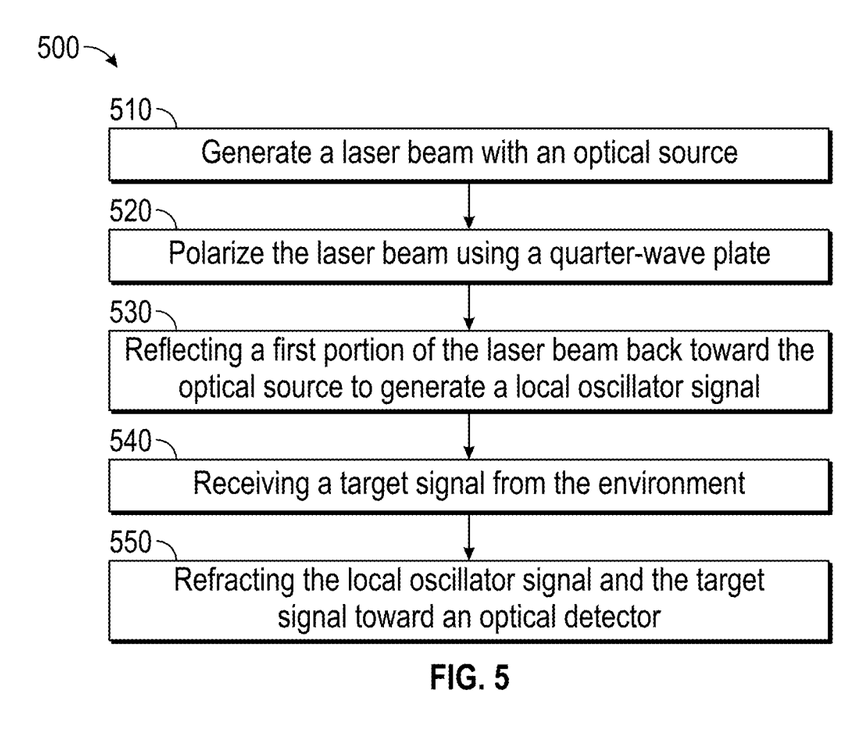
FIG. 5 illustrates an example flow chart of a method for operating a LIDAR system, according to some example implementations.

FIG. 5 illustrates an example flow chart of a method 500 for operating a LIDAR system, according to some aspects of the disclosure. In some embodiments, the flow chart 500 may be performed by one or more components of the systems and apparatuses described with reference to FIGS. 2-4 above. Beginning in block 510, an optical source generates a laser beam along an illumination path. The optical source may generate the laser beam itself, or be a single-mode optical fiber or other waveguide that provides the optical source to passive optical component of an optical circuit.

In block 520, a quarter-wave plate is used to transform polarization of the laser beam. The polarization can generate circular polarization for the laser beam. In some embodiments, a half-wave plate or other type of polarization wave plate may be used to transform the light rather than a quarter-wave plate. After polarization, in block 530, reflection optics can reflect a portion of the laser beam back along the illumination path as a local oscillator. The local oscillator is then transformed back to linearly polarized light that is orthogonal to laser-beam source by the quarter-wave plate. In some embodiments, the reflection optics may be a separate component from other components. However, the reflection optics may also be a reflective coating on the quarter-wave plate or other optics after polarization.

In block 540 a target signal is received back from the environment after reflecting off of an object or objects. The target signal is transformed back to linearly polarized light by the quarter-wave plate that is orthogonal to the polarization of the laser source. The target signal has a delay relative to the local oscillator. This delay allows the two to interfere and create a combined signal including a beat signal.

In block 550, the combined signal is refracted through a polarization selective component that separates beams based on polarization. Because the polarization is orthogonal to the laser source, it is refracted along a different path for collection. The collection path can then be collimated into a path parallel to the optical source for improved collection efficiency by an optical detector. Based on information received by the optical detector and the position of one or more scanning mirrors, the LIDAR system can analyze the signals to great a point in a three-dimensional point cloud. Additional points are generated by altering the position of the mirrors and taking additional measurements.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A light detection and ranging (LIDAR) apparatus comprising:
    a plurality of optical sources, each comprising a single-mode fiber, configured to emit a plurality of laser beams in a first direction;
    a polarization wave plate configured to transform a polarization state of the plurality of laser beams headed in the first direction toward a target environment;
    a reflective optical component to return a portion of the plurality of laser beams toward the plurality of optical sources along a return path and through the polarization wave plate as a local oscillator signal;
    a polarization selective component to separate light in the return path based on an optical polarization, wherein the polarization selective component refracts orthogonally polarized light along the return path to a divergent path, wherein the polarization selective component is further configured to enable interference between the local oscillator signal and a target signal to generate a combined signal;
    an optical detector, comprising a multi-mode fiber, configured to receive the combined signal from a second direction, different than the first direction, that is caused by a birefringent surface of the polarization selective component; and
    lensing optics configured to focus the refracted light along a focal plane where the optical detector is located, wherein a diagonal plane of the polarization selective component is arranged at a focal point of the lensing optics.

2. The LIDAR apparatus of claim 1, further comprising a second optical detector, the second optical detector substantially being co-planar to the optical detector.

3. The LIDAR apparatus of claim 2, wherein the plurality of optical sources provide illumination at different wavelengths.

4. The LIDAR apparatus of claim 1, wherein the plurality of optical sources and the optical detector are disposed with a vertical displacement in a direction of a displacement angle of the polarization selective component.

5. The LIDAR apparatus of claim 1, wherein the reflective optical component comprises a reflected coating on the polarization wave plate.

6. The LIDAR apparatus of claim 1, wherein the polarization selective component comprises one or more of a Rochon prism, a Wollaston prism, or a Senarmont prism.

7. The LIDAR apparatus of claim 1, further comprising a plurality of optical detectors.

8. The apparatus of claim 1, further comprising a fast scanning mirror to direct the plurality of laser beams.

9. A light detection and ranging (LIDAR) system comprising:
a fast scanning mirror to direct a plurality of laser beams in a raster pattern to scan an environment;
optical circuits to generate and receive the plurality of laser beams, the optical circuits comprising:
a plurality of optical sources, each comprising a single-mode fiber, configured to emit the plurality of laser beams in a first direction;
a polarization wave plate configured to transform polarization state of the plurality of laser beams headed in the first direction toward a target environment;
a reflective optical component to return a portion of the plurality of laser beams toward the optical source along a return path and through the polarization wave plate as a local oscillator signal;
a polarization selective component to separate light in the return path based on an optical polarization, wherein the polarization selective component refracts orthogonally polarized light along the return path to a divergent path, wherein the polarization selective component is further configured to enable interference between the local oscillator signal and a target signal to generate a combined signal;
an optical detector configured to receive the combined signal from a second direction; and
lensing optics configured to focus the refracted light along a focal plane where the optical detector is located, wherein a diagonal plane of the polarization selective component is arranged at a focal point of the lensing optics.

10. The LIDAR system of claim 9, further comprising a plurality of optical detectors, the plurality of optical detectors being substantially co-planar to the plurality of optical sources.

11. The LIDAR system of claim 9, wherein the plurality of optical sources and the optical detector are disposed with a vertical displacement in a direction of a displacement angle of the polarization selective component.

12. The LIDAR system of claim 9, wherein the optical detector comprises a multi-mode optical fiber.

13. The LIDAR system of claim 9, wherein the polarization selective component comprises one or more of a Rochon prism, a Wollaston prism, or a Senarmont prism.

14. The LIDAR system of claim 9, wherein a quarter-wave plate is further configured to transform the polarization state of the local oscillator signal and the target signal returned from the target environment or the reflective optical component.

15. The LIDAR system of claim 9, further comprising a second fast scanning mirror, wherein the fast scanning mirror is to scan across a first axis and a second fast scanning mirror is to scan across a second axis.

16. The LIDAR system of claim 9, further comprising a control system, the control system comprising a processing device to:
control optical drivers of active optical circuits;
control motion operation of the fast scanning mirror; and
process one or more signals received from the optical detector to generate a point cloud of a three-dimensional space.

17. A method of operating a light detection and ranging (LIDAR) system comprising:
generating a plurality of laser beams along an illumination path using a plurality of optical sources, each comprising a single-mode fiber;
polarizing the plurality of laser beams with a quarter wave plate to have circular polarization;
reflecting, using a reflective optical component, a portion of the plurality of laser beams back along the illumination path in a collection path to generate a local oscillator signal;
receiving a target signal from a target environment along the illumination path based on reflections from an object in the target environment; and
refracting the local oscillator signal and the target signal toward an optical detector, comprising a multi-mode fiber, using a polarization selective component, wherein the optical detector is configured to receive the target signal from a second direction, different than the illumination path, that is caused by a birefringent surface of the polarization selective component, and wherein a diagonal plane of the polarization selective component is arranged at a focal point of a lensing optics configured to focus the refracted local oscillator signal and the refracted target signal.

18. The method of claim 17 further comprising polarizing, with the quarter wave plate, the refracted local oscillator signal and the target signal to have a first linear polarization orthogonal to a second linear polarization of the plurality of laser beams.

19. The method of claim 17, further comprising collimating, with the lensing optics, the local oscillator signal and the target signal on a collection path parallel to the illumination path to improve collection at the optical detector.

20. The method of claim 17, further comprising a fast scanning mirror to direct the plurality of laser beams.

* * * * *